UNITED STATES PATENT OFFICE.

ERIC EDWARD DUTT, OF JABALPUR, BRITISH INDIA, ASSIGNOR OF ONE-HALF TO PEARY CHAND DUTT, OF JABALPUR, BRITISH INDIA.

PROCESS FOR THE MANUFACTURE OF MAGNESIA.

1,325,932.     Specification of Letters Patent.     Patented Dec. 23, 1919.

No Drawing.     Application filed October 18, 1918. Serial No. 258,708.

*To all whom it may concern:*

Be it known that I, ERIC EDWARD DUTT, a subject of the King of Great Britain, residing at Jabalpur, in the Central Provinces of British India, have invented a new and Improved Process for the Manufacture of Magnesia, of which the following is a clear, full, and exact description.

This invention relates to a process for the manufacture of magnesia from minerals, compounds or ores one of the ingredients of which is a compound of magnesium.

The object of the present invention is to manufacture magnesia from substances containing a magnesium compound, together with various other substances, among the principal of which may be mentioned the compounds of calcium.

To carry out the process the substance containing magnesium is dissolved in hydrochloric acid, and a solution of magnesium and other chlorids is thereby obtained.

One of the most suitable minerals for the purpose set forth in this specification is dolomite, which consists of a mixture of magnesium and calcium carbonates.

The solution of magnesium and calcium chlorids obtained upon dissolving the dolomite in hydrochloric acid is decanted from any insoluble matter present, which consists of the silica and other insoluble impurities present in the raw materials used, and magnesium hydrate, or a mixture of magnesium hydrate and other alkaline earth hydrates or oxids added in sufficient quantity to precipitate any iron that may be present in the solution, in the form of insoluble iron hydrate. The solution is then evaporated to dryness.

The mixture of magnesium and calcium chlorids obtained, as described above, is placed in a retort or rotary furnace and subjected to the action of water vapor, at a temperature of from 450° to 700° C.

The water vapor reacts with the magnesium chlorid, producing hydrochloric acid gas and magnesia, while the calcium chlorid remains unacted upon.

The hydrochloric acid gas is absorbed in water, when it forms liquid hydrochloric acid. The latter is used over again in the process.

After reaction is complete, the mixture of magnesia and calcium chlorid is dissolved in water, when the calcium chlorid being soluble, passes into solution, leaving behind the magnesia as an insoluble residue.

The magnesia is separated from the liquid, washed free from all chlorid, and dried. The residue consists of magnesia.

The solution of calcium is evaporated to dryness and the residue consists of calcium chlorid.

I claim:

1. The herein described process for the manufacture of magnesia from magnesium compounds containing calcium and iron, which consists in dissolving the compound in hydrochloric acid, freeing the solution from iron and other similar impurities by means of an alkaline earth hydrate or oxid, evaporating the clear solution to dryness, subjecting the resultant mixture of chlorids to the action of steam at a temperature of from 450° to 700° C., dissolving the calcium chlorid in water, and separating out the magnesia from the solution.

2. The herein described process for the manufacture of magnesia from magnesium compounds containing calcium and iron, which consists in treating the substance with hydrochloric acid, freeing the resultant solution from iron impurities, evaporating it to dryness, heating the product at a temperature of about 450° to 700° C., in the presence of steam, and separating the magnesia from the calcium chlorid.

In testimony that I claim the foregoing as my invention I have signed my name this 22nd day of July 1918.

ERIC EDWARD DUTT.